(12) United States Patent
Wood et al.

(10) Patent No.: US 7,765,482 B2
(45) Date of Patent: Jul. 27, 2010

(54) WEB-BASED MEDIA SUBMISSION TOOL

(75) Inventors: Lisa T. Wood, Danville, CA (US); Scott M. Lewis, Danville, CA (US); Robin T. Fried, Berkeley, CA (US)

(73) Assignee: Summit 6 LLC, Dallas, TX (US)

( * ) Notice: Subject to any disclaimer, the term of this patent is extended or adjusted under 35 U.S.C. 154(b) by 737 days.

(21) Appl. No.: 10/961,720

(22) Filed: Oct. 8, 2004

(65) Prior Publication Data
US 2005/0060180 A1 Mar. 17, 2005

Related U.S. Application Data

(63) Continuation of application No. 09/357,836, filed on Jul. 21, 1999, now Pat. No. 6,895,557.

(51) Int. Cl.
*G06F 3/00* (2006.01)
(52) U.S. Cl. .................. 715/744; 715/748; 715/769; 709/201; 709/219
(58) Field of Classification Search .................. 715/744, 715/748, 769.704; 709/201, 219
See application file for complete search history.

(56) References Cited

U.S. PATENT DOCUMENTS

| | | | |
|---|---|---|---|
| 4,802,008 A | 1/1989 | Walling | |
| 4,862,200 A | 8/1989 | Hicks | |
| 5,001,628 A | 3/1991 | Johnson et al. | |
| 5,327,265 A | 7/1994 | McDonald | |

(Continued)

FOREIGN PATENT DOCUMENTS

EP 0930 774 A2 7/1999

(Continued)

OTHER PUBLICATIONS

Office Action dated Sep. 6, 2002 for U.S. Appl. No. 09/440,461.

(Continued)

*Primary Examiner*—Tadeese Hailu
(74) *Attorney, Agent, or Firm*—Duane S. Kobayashi

(57) ABSTRACT

The present invention, generally speaking, provides an improved web-based media submission tool. As with some existing tools, operation of the tool is drag and drop or the user can "click" to browse a directory to select media objects. Unlike existing tools, the tool provides the user an opportunity to confirm the submission, for example by generating a thumbnail image of an image file that has been dragged and dropped. Batch submission is provided for in which a user drags and drops a plurality of images or other media objects. Submission from a web page to a web page is also provided for. The submission tool is configurable to perform a variable amount of intelligent preprocessing on media objects prior to upload. In the case of digital images, the tool can perform sizing and formatting, for example. Information capture is performed with information being uploaded together with the media objects. In an exemplary embodiment, information capture is both user-transparent (e.g., user ID and/or password) and user-visible (e.g., the user can provide captions for media objects). The submission of information about the user and the media objects facilitates automatic integration of the media objects within existing databases.

51 Claims, 5 Drawing Sheets

U.S. PATENT DOCUMENTS

| | | | | |
|---|---|---|---|---|
| 5,404,316 | A | * | 4/1995 | Klingler et al. ............. 715/723 |
| 5,477,353 | A | | 12/1995 | Yamasaki |
| 5,555,388 | A | | 9/1996 | Shaughnessy |
| 5,608,542 | A | | 3/1997 | Krahe et al. |
| 5,666,215 | A | * | 9/1997 | Fredlund et al. ............. 358/487 |
| 5,678,046 | A | | 10/1997 | Cahill et al. |
| 5,729,741 | A | * | 3/1998 | Liaguno et al. .......... 707/104.1 |
| 5,754,172 | A | * | 5/1998 | Kubota et al. ............... 715/203 |
| 5,760,917 | A | | 6/1998 | Sheridan |
| 5,761,404 | A | | 6/1998 | Murakami et al. |
| 5,765,152 | A | | 6/1998 | Erickson |
| 5,778,164 | A | * | 7/1998 | Watkins et al. ............. 358/1.18 |
| 5,778,198 | A | | 7/1998 | Kadota |
| 5,781,725 | A | | 7/1998 | Saito |
| 5,781,773 | A | | 7/1998 | Vanderpool et al. |
| 5,794,217 | A | * | 8/1998 | Allen ........................... 705/27 |
| 5,799,063 | A | | 8/1998 | Krane |
| 5,802,314 | A | | 9/1998 | Tullis et al. |
| 5,813,009 | A | | 9/1998 | Johnson et al. |
| 5,819,032 | A | | 10/1998 | De Vries et al. |
| 5,819,092 | A | * | 10/1998 | Ferguson et al. ............. 717/113 |
| 5,844,969 | A | | 12/1998 | Goldman et al. |
| 5,845,299 | A | | 12/1998 | Arora et al. |
| 5,848,415 | A | | 12/1998 | Guck |
| 5,852,435 | A | * | 12/1998 | Vigneaux et al. ............. 345/428 |
| 5,859,956 | A | | 1/1999 | Sugiyama et al. |
| 5,890,170 | A | | 3/1999 | Sidana |
| 5,897,622 | A | * | 4/1999 | Blinn et al. .................... 705/26 |
| 5,923,846 | A | * | 7/1999 | Gage et al. .................. 709/213 |
| 6,012,068 | A | * | 1/2000 | Boezeman et al. ........ 707/104.1 |
| 6,017,157 | A | * | 1/2000 | Garfinkle et al. ............. 396/639 |
| 6,018,774 | A | | 1/2000 | Mayle et al. |
| 6,028,603 | A | | 2/2000 | Wang et al. |
| 6,035,323 | A | * | 3/2000 | Narayen et al. ............. 709/201 |
| 6,058,417 | A | * | 5/2000 | Hess et al. ................... 709/219 |
| 6,084,581 | A | * | 7/2000 | Hunt .......................... 715/202 |
| 6,085,195 | A | | 7/2000 | Hoyt et al. |
| 6,088,732 | A | | 7/2000 | Smith et al. |
| 6,104,468 | A | * | 8/2000 | Bryniarski et al. ............. 355/18 |
| 6,119,101 | A | * | 9/2000 | Peckover ...................... 705/26 |
| 6,125,352 | A | * | 9/2000 | Franklin et al. ............... 705/26 |
| 6,128,600 | A | * | 10/2000 | Imamura et al. ............. 705/27 |
| 6,128,655 | A | * | 10/2000 | Fields et al. ................. 709/219 |
| 6,133,985 | A | * | 10/2000 | Garfinkle et al. ............. 355/40 |
| 6,167,382 | A | * | 12/2000 | Sparks et al. ................. 705/26 |
| 6,167,568 | A | * | 12/2000 | Gandel et al. ................ 717/176 |
| 6,177,934 | B1 | * | 1/2001 | Sugiura et al. ............. 715/748 |
| 6,182,116 | B1 | * | 1/2001 | Namma et al. ............. 709/204 |
| 6,182,279 | B1 | * | 1/2001 | Buxton ....................... 717/100 |
| 6,199,082 | B1 | * | 3/2001 | Ferrel et al. ................. 715/205 |
| 6,202,061 | B1 | * | 3/2001 | Khosla et al. ................... 707/3 |
| 6,233,590 | B1 | * | 5/2001 | Shaw et al. ................. 715/201 |
| 6,237,010 | B1 | * | 5/2001 | Hui et al. .................... 715/205 |
| 6,281,874 | B1 | | 8/2001 | Sivan et al. |
| 6,301,586 | B1 | * | 10/2001 | Yang et al. ............... 707/104.1 |
| 6,301,607 | B2 | | 10/2001 | Barraclough et al. |
| 6,330,572 | B1 | | 12/2001 | Sitka |
| 6,343,302 | B1 | * | 1/2002 | Graham ...................... 715/205 |
| 6,374,260 | B1 | * | 4/2002 | Hoffert et al. ............ 707/104.1 |
| 6,381,029 | B1 | | 4/2002 | Tipirneni |
| 6,456,591 | B1 | * | 9/2002 | Mishra ....................... 370/229 |
| 6,489,954 | B1 | * | 12/2002 | Powlette ..................... 715/733 |
| 6,489,980 | B1 | * | 12/2002 | Scott et al. .................. 715/854 |
| 6,505,160 | B1 | | 1/2003 | Levy et al. |
| 6,510,418 | B1 | * | 1/2003 | Case et al. ..................... 705/26 |
| 6,516,340 | B2 | | 2/2003 | Boys |
| 6,522,418 | B2 | * | 2/2003 | Yokomizo et al. .......... 358/1.15 |
| 6,535,296 | B1 | * | 3/2003 | Oak .......................... 358/1.15 |
| 6,539,420 | B1 | | 3/2003 | Fields et al. |
| 6,542,936 | B1 | | 4/2003 | Mayle et al. |
| 6,567,983 | B1 | * | 5/2003 | Shiimori ..................... 725/105 |
| 6,583,799 | B1 | | 6/2003 | Manolis et al. |
| 6,621,938 | B1 | | 9/2003 | Tanaka et al. |
| 6,628,417 | B1 | | 9/2003 | Naito et al. |
| 6,657,702 | B1 | * | 12/2003 | Chui et al. ..................... 355/40 |
| 6,693,635 | B1 | * | 2/2004 | Yokomizo ................... 345/428 |
| 6,711,297 | B1 | * | 3/2004 | Chang et al. ................ 382/240 |
| 6,732,162 | B1 | | 5/2004 | Wood et al. |
| 6,799,165 | B1 | | 9/2004 | Boesjes |
| 6,853,461 | B1 | * | 2/2005 | Shiimori ..................... 358/1.15 |
| 6,871,231 | B2 | | 3/2005 | Morris |
| 6,895,557 | B1 | | 5/2005 | Wood et al. |
| 6,930,709 | B1 | | 8/2005 | Creamer et al. |
| 7,010,587 | B1 | | 3/2006 | Shiimori |
| 7,032,030 | B1 | | 4/2006 | Codignotto |
| 7,036,081 | B2 | * | 4/2006 | Powlette ..................... 715/747 |
| 7,043,527 | B2 | | 5/2006 | Shiimori et al. |
| 7,146,575 | B2 | | 12/2006 | Manolis et al. |
| 7,158,172 | B2 | | 1/2007 | Kawaoka et al. |
| 7,246,147 | B2 | * | 7/2007 | Kim et al. ................... 709/203 |
| 7,257,158 | B1 | * | 8/2007 | Figueredo et al. ....... 375/240.01 |
| 7,280,702 | B2 | * | 10/2007 | Chang et al. ................ 382/240 |
| 7,308,413 | B1 | * | 12/2007 | Tota et al. ....................... 705/7 |
| 7,313,604 | B2 | | 12/2007 | Wood et al. |
| 7,315,386 | B1 | * | 1/2008 | Shiimori et al. ............. 358/1.15 |
| 2002/0067500 | A1 | * | 6/2002 | Yokomizo et al. .......... 358/1.15 |
| 2005/0239454 | A1 | | 10/2005 | Kawashima et al. |
| 2005/0262437 | A1 | * | 11/2005 | Patterson et al. ............ 715/517 |
| 2008/0201236 | A1 | * | 8/2008 | Field et al. .................... 705/26 |

FOREIGN PATENT DOCUMENTS

| | | |
|---|---|---|
| EP | 1076302 A1 | 2/2001 |
| JP | 8-153183 | 6/1996 |
| JP | 11-69072 | 3/1999 |
| JP | 11-184943 | 7/1999 |
| WO | WO 97/04353 A1 | 2/1997 |
| WO | WO 98/49631 A2 | 11/1998 |
| WO | WO 99/19811 A3 | 4/1999 |

OTHER PUBLICATIONS

Office Action dated Apr. 21, 2003 for U.S. Appl. No. 09/440,461.
Office Action dated Nov. 23, 2001 for U.S. Appl. No. 09/357,836.
Office Action dated Jun. 5, 2002 for U.S. Appl. No. 09/357,836.
Office Action dated Nov. 8, 2002 for U.S. Appl. No. 09/357,836.
Office Action dated Jun. 4, 2003 for U.S. Appl. No. 09/357,836.
Thilo Horstmann and Richard Bentley, "Distributed Authoring on the Web with the BSCW Shared Workspace System", StandardView vol. 5, No. 1, pp. 9-16, Mar. 1997.
Doug Dean, 15 Seconds: Down and Dirty Browser Uploading with a VB ASP Componenet, pp. 1-10, Mar. 11, 1999.
Peter Persits, 15 Seconds: Browser-based uploading Under the Microscope, pp. 1-7, Nov. 21, 1998.
Netscape Communications Corp., Help File of Netscape Composer 4.75, Copyright 1994-1998, p. 9.
Emily Cohen, "Set Your Sites High," PC Magazine, May 26, 1998.
Plante et al., "The NCSA Astronomy Digital Image Library: From Data Archiving to Data Publishing," Sep. 21, 1998.
Augot et al., "Secure Delivery of Images over Open Networks," Proceedings of the IEEE, vol. 87, Issue 7, pp. 1251-1266, Jul. 1999.
Persits, Peter, "Browser-Based File Uploading Under the Microscope," 15 Seconds, Nov. 21, 1998.
Dean, Doug, "Down and Dirty Browser Uploading with a VB ASP Component," Mar. 11, 1999.
Horstmann et al., "Distributed Authoring on the Web with the BSCW Shared Workspace System," StandardView, vol. 5, No. 1, Mar. 1997.
Netscape Communications Corporation, "Creating Web Pages," Apr. 27, 1999.
Steinberg, Jill, "New Start-Up Releases Java Application and Enabling Software," JavaWorld, Oct. 1, 1996.
Bilson, Rob, "Net-It Central 1.0," IDM, Jul. 31, 1997.
Warp 10 Technologies Inc., Jul. 10, 1998.
Pictra Incorporated, Nov. 11, 1998.
Letter from Terry Anderson to Craig Hamway, Oct. 16, 1997.

PictureWorks ADP Demo, May 1, 1998.
Letter from Terry Anderson to Ken Karutz, May 1, 1998.
Email from Scott Lewis to Lisa Wood, Jul. 2, 1998.
Email from Robin Fried to Scott Lewis et al., Jul. 5, 1998.
Email from Scott Lewis to Robin Fried, Jul. 8, 1998.
Email from Robin Fried to Martha White, Jul. 9, 1998.
Email from Robin Fried to Scott Lewis et al., Jul. 9, 1998.
Email from Don Strickland to Lisa Wood et al., Jul. 14, 1998.
Emails from Scott Lewis to Lisa Wood et al., Jul. 17-18, 1998.
PictureWorks Technology, Inc. Board Update, Jun. 20, 1998.
Letter from Terry Anderson, Jul. 22, 1998.
Email from Don Strickland to Lisa Wood et al., Jul. 22, 1998.
Emails from Don Strickland, Jul. 27 and Aug. 7, 1998.
Email from Robin Fried to Scott Lewis et al., Jul. 28, 1998.
Email from Scott Lewis to Lisa Wood et al., Jul. 29, 1998.
Prioritized Activities For Enterprise Team, Jul. 31, 1998.
Email from Don Strickland to Criag Hamway, Aug. 2, 1998.
Board Update from Don Strickland, Aug. 7, 1998.
Email from Lisa Wood, Aug. 10, 1998.
Email from Scott Lewis to Terry Anderson, Aug. 13, 1998.
Letter from Terry Anderson to Randy Kau, Aug. 14, 1998.
Email from Kirby Lunger to Don Strickland et al., Aug. 14, 1998.
Email from Kirby Lunger to Lisa Wood, Aug. 26, 1998.
Email from Terry Anderson to Don Strickland, Aug. 25, 1998.
Email from Kirby Lunger to Lisa Wood, Aug. 31, 1998.
Email from Robin Fried to Scott Lewis et al., Sep. 1, 1998.
Email from Scott Lewis to Lisa Wood et al., Sep. 1, 1998.
Email from Don Strickland to Terry Anderson et al., Sep. 8, 1998.
Email from Scott Lewis to Jeff Paradise, Sep. 11, 1998.
Letter from Terry Anderson to Howard Latham, Sep. 15, 1998.
Email from Scott Lewis to Jim McCarthy, Sep. 17, 1998.
Email from Terry Anderson to Don Strickland et al., Sep. 18, 1998.
Email from Scott Lewis to Lisa Wood et al., Sep. 22, 1998.
Letter from Anthony Delli Colli to Wayne Mangold, Sep. 18, 1998.
Email from Scott Lewis to Lisa Wood et al., Sep. 23, 1998.
Email from Robin Fried to Stu Roberson, Sep. 21, 1998.
Letter from Terry Anderson to Sei-Wai Lee, Sep. 24, 1998.
Email from Scott Lewis to Lisa Wood, Sep. 25, 1998.
Email from Terry Anderson to Lisa Wood et al., Sep. 29, 1998.
Letter from Scott Lewis to Karim El-Fishaway, Oct. 2, 1998.
Email from Anthony Delli Colli to Stu Roberson et al., Oct. 2, 1998.
PictureWorks presentation to eBay, Oct. 16, 1998.
Letter from Scott Lewis to Gary Dillabough, Oct. 20, 1998.
Email from Don Strickland to PWT Employees, Oct. 31, 1998.
Press Release, Moore Data Management Services and PictureWorks Technology Inc., Announce Partnership to Revolutionize Use of Real Estate Photos on the Internet, Nov. 6, 1998.
Press Release, PictureWorks Technology Inc., Streamlines Posting of Photos to the Internet, Nov. 6, 1998.
Email from Laurie Fleming to Andrew Hunter et al., Nov. 13, 1998.
Letter from Scott Lewis to Wayne Graves, Nov. 16, 1998.
Email from Scott Lewis to Terry Anderson et al., Nov. 20, 1998.
Screenshots from Prepare and Post Video, Nov. 20, 1998.
Laura Roe, "New Software Gives Real Estate a View of the Future," National Real Estate Investor, Dec. 1, 1998.
PictureWorks Information, Dec. 9, 1998.
PictureWorks Prepare & Post, Fourth Quarter, 1998.
Prepare & Post Product Overview, Fourth Quarter, 1998.

Letter from Terry Anderson to Neil Shafran, Jan. 12, 1999.
Letter from Stu Roberson to James Rowley, Jan. 29, 1999.
Product Picks, Realtor Magazine, Feb. 1, 1999.
PictureWorks Kodak Presentation, Feb. 24, 1999.
Letter from Don Strickland to Phil Ashe, Mar. 2, 1999.
PictureWorks ADP Presentation, Mar. 11, 1999.
PictureWorks Press Release, "Picture Works Releases New Free Digital Imaging Software; MediaCenter Offers Essential Tools for Web Imaging," Mar. 31, 1999.
PictureWorks Press Release, "PictureBay.com to Give-Away 30 Digital Cameras in 30 Days," Apr. 12, 1999.
PictureWorks Press Release, "PictureWorks Technology's PictureBay Solves #1 Frustration of eBay Members, Adding Pictures to Auctions," Apr. 12, 1999.
PictureWorks Press Release, "PictureWorks Technology's Rimfire Empowers any Website to Easily Accept, Process, and Display Visitor Photos and Media," Apr. 12, 1999.
Rimfire real-time integrated media brochure, Apr. 12, 1999.
Letter from Terry Anderson to Jonathan Graff, Apr. 26, 1999.
Sales Update, Apr. 30, 1999.
"Picture Works Plans to Become Powerhouse in Internet Imaging—Exlusive Interview with CEO," The Future Image Report, vol, 7, Issue 1, May 1, 1999.
Email from Laurie Fleming to Terry Anderson et al., May 7, 1999.
Roland Woerner et al., "eBay for Dummies," Chapter 12, May 10, 1999.
Letter from Scott Lewis to Rolan Woerner, May 10, 1999.
Letter from Stu Roberson to Jim Ferras, May 25, 1999.
Rimfire real-time integrated media, May 27, 1999.
Letter from Scott Lewis to Candace Gates, May 28, 1999.
Letter of Intent between PictureWorks Technology, Inc. and Auction Universe, May 31, 1999.
Letter from Scott Lewis to Matthew Lengfelder, Jun. 1, 1999.
"Casio and PictureWorks Announce Co-Branding and Distribution Agreement; MediaCenter Offers Essential Tools for Web Imaging," Jun. 3, 1999.
Sales Update, Jun. 4, 1999.
Email from Laurie Fleming to Terry Anderson et al., Jun. 7, 1999.
PictureWorks pricing for prototype, Jun. 9, 1999.
PictureWorks proposal, Jun. 9, 1999.
PictureWorks scope of work, Jun. 9, 1999.
Letter from Terry Anderson to Amazon, Jun. 9, 1999.
"PictureWorks Announces Co-Branding and Distribution Agreements with On-Line Photo Services Companies," Jun. 14, 1999.
PictureWorks Polaroid presentation, Jun. 15, 1999.
Email from Lisa Wood to Don Strickland et al., Jun. 30, 1999.
East Bay Business Times, "PictureWorks Founder Keeps True to Original Vision," Jul. 2, 1999.
PictureWorks Technology Proposal, Jul. 9, 1999.
Press Release, "Picture Works Releases New, Free Imaging Weblication; MediaCenter 1.1 Offers Essential Photo Tools for Internet Imaging and Web Publishing, Ideal for Digital Camera Users," Jul. 19, 1999.
Press Release, "Picturebay is the Fastest and Easiest Way to Add Pictures to Auctions," Aug. 3, 1999.
Picturebay Screenshot, Oct. 13, 1999.

* cited by examiner

Homes Realtor Services

Getting Started | Send Photos | Homes | Financing | Offer & Closing | Help

Adding Photos to your listings

Get better exposure for your listings by including some pictures of the property. Its easy! Just locate the folder on your computer containing your photos, and then drag them into the boxes below. Select a descriptive caption for each photo and then click the "Send Photos" button.

*Frequently Asked Questions* ⓘ

[Drag Photo Here | Front View ▽]
[Drag Photo Here | Front View ▽]
[Drag Photo Here | Front View ▽]
[Drag Photo Here | Front View ▽]

Listing Name [_____]  [Send Photos]

Today's Rates
30-Year Fixed    6.75%
15-Year Fixed    6.45%
1-Year Adjustable   5.6%
*National average rates

[Find a Loan] [Rate News]

Highlights
Welcome to Homes!
We hope you enjoy our site
Please send us your feedback

Home & Rate Trackers
Receive free e-mail updates

FIG. 1

PWImageControl Interface:

| Interface Name | Type | Definition | Signature |
|---|---|---|---|
| ScaleImage | function | Scales an image in place or to a temporary file | ScaleImage(<br>destinationType as String,<br>changeDimensions as Integer,<br>destWidth As Integer,<br>destHeight As Integer,<br>destQuality As Integer, '0-100<br>generateOutputFilename As Boolean ' create tempfile<br>) As String |
| DelTempFile | sub | Deletes temporary file created with ScaleImage | DelTempFile() |
| fileName | String property | Name of file shown in image well | fileName as String |
| imageName | String property | String value from image caption box | imageName as String |
| ClearImage | sub | Clears the image from the display and redisplays the logo and instructional text | ClearImage() |
| backgroundColor | String property | Hexideciaml RGB string value in format "FFFFFF" or "#FFFFFF" | backgroundColor as String |
| textColor | String property | Hexideciaml RGB string value in format "FFFFFF" or "#FFFFFF" | textColor as String |

FIG. 3

PWMediaSendControl Interface:

| Interface Name | Type | Definition | Signature |
|---|---|---|---|
| SubmitMediaRequest | function | Transfers image and returns a status code. The action is successful if the return code is 0. If non-zero return code examine ServerRetString for a reason. | SubmitMediaRequest(<br>UserID As String, 'partner UID<br>Password As String, 'partner password<br>ServiceType As String, '"HOST" or "MIRROR"<br>IndustryCode As Integer, 'e.g., 65=real estate<br>MediaType As Integer, '1=image 2=video 3=sound<br>OpCode As Integer, '1=Add, 2=Update, 3=Delete<br>IPAddr As String, 'Destination IP address<br>filename As String, 'File to send<br>MediaGroupID As String, 'Used to build unique key<br>MediaExtendedID As String, ' ""<br>MediaSequenceNum As Integer, ' ""<br>Desc1 As String, '255 chars<br>Desc2 As String, '255 chars<br>Desc3 As String<br>preScaled as Integer) as Integer '255 chars |
| ServerRetString | String property | Return value from SubmitMediaRequest. If call made on HOST service, this string contains the IMG SRC url | ServerRetString as String |

FIG. 4A

```
Usage Example (VB Script)
tempFileName=DragImage1.ScaleImage(320, 240, 89, 1)   'scale the image object 'DragImage1'
result=UplHandler.SubmitMediaRequest(                  'transmit to mad central
    UserID,
    Password,
    ServiceType,
    0,
    1,
    1,
    ipAddress,
    tempFileName,
    misNum.Value,
    zipcode,
    imageCount,
    title,
    desc2,
    desc3,
    1)
DragImage3.DelTempFile      'delete the temp file
```

WEB-BASED MEDIA SUBMISSION TOOL

This application is a continuation of U.S. application Ser. No. 09/357,836, filed Jul. 21, 1999 now U.S. Pat. No. 6,895,557. Priority to or reliance on all other applications is expressly disclaimed.

BACKGROUND OF THE INVENTION

1. Field of the Invention

The present invention relates to the handling, manipulation and processing of digital content and more particularly to the transportation and Internet publishing of digital content, particularly image media objects and rich media.

2. State of the Art

Much of the phenomenal success of the web is attributable to its graphical nature. Literally, a picture is worth a thousand words. The capture of digital images has become routine, using digital cameras and scanners. Nevertheless, although the handling of images by web-site creators has achieved a high degree of automation, for the average technology user (the "imaging civilian"), manipulating and sharing digital images over the Internet remains a cumbersome and daunting process. Piecemeal solutions that have been devised for handling digital images require a level of sophistication that is beyond that of the ordinary user. For example, transferring a digital image may require first downloading a FTP program, then installing it, then running it and connecting to an FTP server by typing the server name in the connection dialog, then navigating to the proper subdirectory, selecting the files to be uploaded, making sure that the program is in binary transfer mode, then sending the files. For the imaging civilian, such an involved process can be daunting to say the least.

Additionally, as technologies advance and casual users begin to experiment with other media objects, such as streaming video, 3D objects, slide shows, graphics, movies, and even sound files that accompany imaging data, the processes required to share these rich media types on the Internet becomes exponentially more complicated and prohibitive. As the realization of the Internet as an interactive, content rich medium becomes more and more a reality, the need for enabling the use and distribution of rich content and media on the Internet will become the gating factor to its long term success.

A broad-based solution to the foregoing problem requires a web-based media submission tool that allows for submission of media objects in a convenient, intuitive manner. A company named Caught in the Web, has attempted to create a broad-based media submission tool known as "ActiveUpload". ActiveUpload allows an arbitrary file to be dragged and dropped onto a web page control for upload to the web server. An ActiveUpload control allows users to, without leaving a web page, transfer files to a server (Internet or intranet) by selecting the files on the user's desktop that the user wants to transfer, then dragging them onto the web page. For example, a user, having visited a web page, can contribute pictures, documents, zip files, etc., without having to leave the web page and use an FTP program. Standard web authoring tools can be used to integrate ActiveUpload into web pages and change the behavior of the control.

Although Caught in the Web's ActiveUpload tool simplifies the user experience, it does little toward furthering "back-end" automation in the handling and distribution of media objects and has no built in "intelligence" to streamline the process of handling and transporting rich media objects from the front end.

SUMMARY OF THE INVENTION

The present invention, generally speaking, provides an improved web-based media submission tool. As with some existing tools, operation of the tool is drag and drop or the user can "click" to browse a directory to select media objects. Unlike existing tools, the tool provides several unique and valuable functions. For example, the tool provides the user an opportunity to confirm the submission with a visual representation, for example by generating a thumbnail image of the rich media file that has been selected. Additionally, batch submission is provided to allow a user to drag and drop or select a plurality of images or other media objects. Submission from a web page to a web page is also provided for. Even more importantly, the submission tool is configurable to perform a variable amount of intelligent preprocessing on media objects prior to upload. In the case of digital images, the tool can perform sizing and formatting, for example. Information capture is performed with information being uploaded together with the media objects. In an exemplary embodiment, information capture is both user-transparent (e.g., user ID and/or password) and user-visible (e.g., the user can provide captions for media objects). The submission of information about the user and the media objects facilitates automatic integration of the media objects within existing databases.

BRIEF DESCRIPTION OF THE DRAWING

The present invention may be further understood from the following description in conjunction with the appended drawing. In the drawing:

FIG. 1 is a diagram of an exemplary web page providing media object acquisition functions;

FIG. 3 is a table pertaining to a first portion of the Prepare and Post component design.

DETAILED DESCRIPTION OF THE PREFERRED EMBODIMENTS

Figure 2:
FIG. 2 is a diagram of another exemplary web page providing image acquisition functions.

The following describes the Prepare and Post™ tools, which prepares and submits media objects from inside a standard browser, referred to as the first location, to a second location or server. The media objects may be pictures (images), movies, videos, graphics, sound clips, etc. Although in the following description the submission of images is described in greatest detail, the same principles apply equally to media objects of all descriptions.

The Prepare and Post tools refers to browser-side components which together provide the ability to submit and transport media objects over the web to be stored and served. Using the Prepare and Post tools, end users can submit images in an immediate, intuitive manner. No technical sophistication is required. In particular, understanding technical terms such as JPEG, resolution, pixel, kilobyte, transfer protocol, IP address, FTP etc., is not required, since the Prepare and Post tools handles all of these tasks for the user. The benefits of the Prepare and Post tool are:

a) to the image submitter, the ability to submit media objects to web pages immediately without needing to overcome technical obstacles;

b) to the image submitter, the ability to submit media objects to web pages "as is" without making modifications to the media objects prior to sending.

c) to PictureWorks web site partner, access to a uniform, standardized, reliable and secure channel for media acquisition;

d) to PictureWorks web site partner, access to contributed media "made to order", it meets their imaging specifications every time without human intervention;

e) to PictureWorks web site partner, the ability to provide web site visitors with an easy, error free way to contribute media;

f) to PictureWorks web site partner, access to contributed media in "real time" with no time delays.

The two primary components used in the Prepare and Post tools which carry out these functions are 1) the media object identifier and 2) the media sender.

In general, the media object identifier functions to provide a graphical interface for placing and associating a media object from a user's desktop onto a web page. The media sender carriers out the function of transmitting media objects to a second location.

There are two ways media objects on the first location become associated with a media object identifier. The first is through a "drag and drop" behavior where the user clicks on a media object to select the one they want to submit. The media object is then dragged to the media object identifier. Releasing the mouse button associates the media object with the media object identifier. This behavior is allowed in web browsers that support drag and drop functionality. The Prepare and Post tools enable these browsers to accept media objects via drag and drop by providing the media object identifier as an ActiveX component.

The second way to associate a media object on the first location with the media object identifier is to click on the media object identifier to browse for media objects, then select the media object of choice. This method is made available for web browsers where the media object identifier needs to be a pure Java component. (Such "signed applet browsers" like Netscape Navigator) In this instance, the user may be asked to choose a media object in a similar manner as when choosing a file to be opened, either by graphical navigation or by specifying a path name. For example, a prompt associated with the media object identifier may be displayed prompting the user to click within the media object identifier. Clicking within the media object identifier brings up a browse dialog. Using the browse dialog, the user selects the desired media object, which is then placed in the media object identifier. The Prepare and Post tools will generate a visual representation or thumbnail of the media object, a feature currently not available in signed applet browsers.

Real estate is an example of a prime application of the Prepare and Post tools. "Curb appeal" is of great importance in the realty industry and can only be judged by "drive-bys," which are time-consuming and laborious, or by the availability of images. The Prepare and Post tools make real estate images readily available with a minimal amount of effort.

Referring to FIG. 1, an example is shown of a realty web page featuring the described Prepare and Post tools functionality. The user associates images with a media object identifier via the methods described above and selects appropriate captions for the images, e.g., living room, family room, etc. The captions may be typed in or selected from menus. The user also supplies identifying information, in this instance the MLS listing number. When the user clicks the Send button, the images are uploaded and processed immediately according to the configuration of the Prepare and Post tools.

The Prepare and Post tools also support a batch interface, allowing a plurality of images to be submitted simultaneously as in the case of a professional photographer, for example. The opportunity for user confirmation is again provided, e.g., by displaying a visual representation of the images in the batch.

If a mistake is made such that the wrong image is placed in an media object identifier, the correct image may be placed in the media object identifier. The correct image will replace the mistaken image. Alternatively, the user may remove an image from a media object identifier by right-clicking on the media object identifier and selecting Remove within a resulting pop-up menu.

Note that any number of media object identifiers may be provided on a web page and that the media object identifiers may be separate or grouped. This is evident in FIG. 2. The number of media object identifiers provided on a page can be pre-configured and fixed, allowing no user intervention, or the media object identifiers can be generated dynamically, allowing the user to determine how many media object identifiers they need for media submission. FIG. 2 shows a web page with various sizes of media object identifiers. If a media object identifier is separate, its image will be transmitted separately to the second location. If an media object identifier is part of a group, its image will be transmitted to the second location as part of a group of images that are stored together and cataloged together. Media object identifiers that are associated together as a group are noted as such in the web page interface and transparently in the media object identifier object code. Moreover, a web page may have multiple groups of media object identifiers, or "groups of groups."

The usefulness of images is greatly enhanced by capturing and identifying information about the images and submitting the identifying information with the images. Information may be image-specific, user-specific or both. The submission of information about the user and the media objects facilitates automatic integration of the media objects within existing databases. Information capture may be overt or covert or both. This unique automatic database integration enables the images to be served with the proper web page data. Overt information capture relies upon the user to make menu selections of appropriate captions as illustrated in FIG. 1, or to make text entries within text fields, or both. The Prepare and Post tools are easily customized to accept menu selections and text fields for different applications. Covert information capture occurs by having the web browser automatically pass to the Prepare and Post tools known information such as a user ID or password used to access the web page.

A key differentiator of the Prepare and Post tools is the browser, or client-side intelligence built into the tools. This intelligence directly provides features including those already outlined such as associating data with media objects, generating a visual representation of the media objects and generating media object identifiers dynamically or in a pre-set manner. Other features are also provided via this intelligence, specifically, the ability to control the width and height of the media object identifier and the ability to preprocess the media objects in any number of ways prior to transporting to a second location. In the case of an image media object for example, the Prepare and Post tools may resize the image, (i.e., increase or decrease its size as defined by either physical dimensions, pixel count, or kilobytes). Compression, for example, is a type of sizing. The Prepare and Post tools may also change the image's file format (a way of a media object being identified as to a "type" or "kind" of media), change the quality setting of the image, crop the image or change the aspect ratio, add text or annotations, encode or combine (including stitching) the media object, or enhance the media object by changing image values, for example, relating to contrast or saturation. This intelligence may be executed in a manner that is transparent to the end user. This transparency allows the end user to submit media to the Prepare and Post tools "as is," since the tools will automatically prepare it to meet the requirements of the second location. Note that, although image submission may involve client-side processing, image processing is not required.

The Prepare and Post tools are available for customers to integrate into their own web pages. The Prepare and Post tools are easily integrated into web sites (customers) to allows those sites to accept media objects from web site visitors (users). Appendix A is a generic HTML HostTemplate illustrating how Prepare and Post components are integrated into a web page. The HTML template file (which is a complete working example) contains instructions and a few small code snippets that the customer pastes into the web page. Integrating the Prepare and Post components requires an Initialization Section, a Configuration Section, an ImageWell (media object identifier) Section, a Submission Section and an ImageUpLoad Control Section. To include the Prepare and Post tools media object identifiers on a web page, the customer cuts and pastes code snippets for these sections from the template into the web page.

The Initialization Section consists of a few lines of JavaScript code that will download all of the needed Prepare and Post submission components.

The Configuration Section overrides various configurable default settings that the customer can control. In the Configuration Section, the media object identifier component is sized and configured to perform any preprocessing of the image that may be desired prior to upload. Configurable parameters include both fixed values for all submissions (per submission values) and fixed values for all images within a submission (per image values), as will be explained presently.

Fixed values for all submissions include DefaultImageWidth and DefaultImageHeight, as well as include DefaultControlWidth and DefaultControlHeight. The former specify the default width and height of the images after they have been compressed for transmission. The latter specify the default width and height of all media object identifiers. To create media object identifiers having different sizes, the customer specifies the desired size when creating the media object identifier. Another fixed value for all submissions is Quality. This determines the quality level of the images after they have been compressed for transmission (0 is the lowest quality/highest compression and 100 is the highest quality/lowest compression).

Fixed values for all media objects within a submission include Key1 and Key2. Key1 is the primary value that determines the filename of the resulting image file and, consequently, its URL. It is important that each submitted image have a unique name to prevent one image from overwriting another. Key2 is an optional secondary key that is appended to Key1 before the image's filename and URL are created. While default values for Key1 and Key2 can be specified in the configuration section, more likely this value will be supplied from a field in the web form. If the web page form contains a control named "Key1," then its value will be used for this key. For example, the field Key1 might be labeled as "MLS Number" on the web page. Similarly, the field Key2 might be labeled "Zip Code" on the web page. A sequence number is appended to the Key1/Key2 combination. When there are multiple media object identifiers on a page, this will ensure that each image has a unique key.

All media object identifiers on a web page must be contained within an HTML form. A single line of JavaScript code is inserted into the web page (within the HTML form) in each place where a media object identifier is desired. The Media object identifier Section can specify the width and height for each media object identifier. If the width and height are omitted, then the default width and height from the Configuration Section are used.

The Submission Code Section contains HTML code that creates the button that submits both the images to the second locations and the form to the customer's server. Within the Submission Code Section, an HTML "href" parameter is required for the Send Button that causes the images to be sent. After the images have been sent, the web page form will be submitted in the standard manner. The form must define two hidden fields named "url" and imagecount." The imagecount field will contain the number of images actually transmitted. In an exemplary embodiment, the URL for images 2 through "n" are generated by replacing the initial sequence number at the end of the returned URL with the desired image number.

The ImageUpload Control Section holds a small piece of JavaScript code that is placed at the very end of the body section of the web page. This code creates the non-visible Image Upload control, or media sender, that performs the transfer of images from the user's machine to the second location.

The Prepare and Post components support multiple browsers and dynamically adjust their behavior according to the type of browser that is currently running. For example, under supported versions of Microsoft's browsers, media object identifiers are implemented as ActiveX controls, while under supported Netscape browsers, media object identifiers are implemented as Java Applets. This multiple browser support is completely automatic.

Figures 4, 4B:
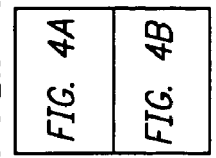
FIG. 4 is a table pertaining to a second portion of the Prepare and Post component design.

FIGS. 3 and 4 present further details of the media object identifier and media sender components, respectively.

From the foregoing description, it will be appreciated that the present media submission tool, besides offering convenience to the end user, offers convenience and flexibility to technology partners. In particular, web page integration is designed to facilitate automatic server-side integration of media content.

It will be apparent to those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

APPENDIX A

HostTemplate generic.htm

```
<HTML>
<HEAD>
<!--*************************************************** Begin Initialization Section -->
<!--***** This section of code must appear at          -->
<!--***** the beginng of the <HEAD> section of         -->
```

APPENDIX A-continued

HostTemplate generic.htm

```
<!--***** your web page. Copy this code and       -->
<!--***** paste it directly into your web page.   -->
<SCRIPT type="text/javascript" src="http://157.22.134.49/company/pwtcomponents.js"></SCRIPT>
<SCRIPT type="text/javascript" src="http://157.22.134.49/company/company.js"></SCRIPT>
<!--************************************************ End Initialization Section -->
</HEAD>
<BODY>
<!--************************************************ Begin Configuration Section -->
<!--***** This section of code must appear        -->
<!--***** anywhere after the initialization       -->
<!--***** section (above), and before the         -->
<!--***** the <FORM> that contains the image      -->
<!--***** wells.                                  -->
<!--*****                                         -->
<!--***** This section defines data values        -->
<!--***** needed by the image wells. You can      -->
<!--***** modify these values to suit             -->
<!--***** your needs.                             -->
<SCRIPT Language="Javascript">
PWT.Key1 = "name-your-image-here";   // If the <FORM> contains fields named 'Key1'
PWT.Key2 = " ";                      //   & 'Key2' their values will be used.
PWT.Quality = 93;
PWT.DefaultImageWidth = 640;
PWT.DefaultImageHeight = 480;
PWT.DefaultControlWidth = 326;       // Includes a 3 pixel border
PWT.DefaultControlHeight = 246;      // Include a 3 pixel border
</SCRIPT>
<!--************************************************ End Configuration Section -->
<FORM>
This sample displays a working image well.
<BR>
<!--************************************************ Begin ImageWell Section -->
<!--***** This code creates an image well on      -->
<!--***** the web page. While this template       -->
<!--***** only contains a single image well,      -->
<!--***** you can use as many as you like.        -->
<!--***** Copy this code into your web page       -->
<!--***** anywhere within your <FORM> where       -->
<!--***** you want an image well to appear.       -->
<SCRIPT Language="Javascript">
PWT.addimagecontrol( );              // or "PWT.addimagecontrol(640,480);" to override
                                     // the default width and height.
</SCRIPT>
<!--************************************************ End ImageWell Section -->
<BR>
This text is after the image well.
<P>
<!--************************************************ Begin Submission Code Section -->
<!--***** You can use any type of button you      -->
<!--***** wish, but rather than it being a        -->
<!--***** standard SUBMIT button, it must         -->
<!--***** instead contain the parameter:          -->
<!--*****                                         -->
<!--*****      onclick="PWT.Submit( )"            -->
<!--*****                                         -->
<!--***** (as shown in the example below).        -->
<!--***** After the images have been sent,        -->
<!--***** your web page FORM will be submitted    -->
<!--***** in the standard manner.                 -->
<!--*****                                         -->
<!--***** Your FORM must define two hidden        -->
<!--***** fields named "url" & "imagecount"       -->
<!--***** (see examples below). The "url"         -->
<!--***** field will be populated with the        -->
<!--***** resulting URL of the first (or only)    -->
<!--***** image submitted, and the "imagecount"   -->
<!--***** field will contain the number of        -->
<!--***** images actually transmitted. The URL    -->
<!--***** for images 2 thru n can be generated    -->
<!--***** by replacing the initial sequence       -->
<!--***** number (which will always be "1")       -->
<!--***** at the end of the returned URL with     -->
<!--***** the desired image number.               -->
<INPUT type="hidden" name="url">
<INPUT type="hidden" name="imagecount">
```

APPENDIX A-continued

HostTemplate generic.htm

```
<INPUT type="button" value="Submit Images" onclick="PWT.Submit( )">
</FORM>
<!--*********************************************** End Submission Code Section -->
<!--*********************************************** Begin ImageUpload Control Section -->
<!--***** This section of code must appear at     -->
<!--***** the end of the <BODY> section of        -->
<!--***** your web page. Copy this code and       -->
<!--***** paste it directly into your web page.   -->
<SCRIPT Language="Javascript">
PWT.adduploadcontrol( );
</SCRIPT>
<!--*********************************************** End ImageUpload Control Section -->
</BODY>
</HTML>
```

What is claimed is:

1. A computer implemented method of pre-processing digital content in a client device for subsequent electronic publishing, comprising:
   a. receiving pre-processing parameters from a remote device, said pre-processing parameters including a specification of an amount of digital content, said digital content including one or more of image content, video content, and audio content;
   b. receiving an identification of a group of one or more items of digital content for transmission, a collective digital content of said group of one or more items of digital content being limited by said received pre-processing parameters;
   c. pre-processing said identified group of one or more items of digital content using said received pre-processing parameters, said received pre-processing parameters controlling said client device in a placement of said identified group of one or more items of digital content into a specified form in preparation for publication to one or more devices that are remote from a server device and said client device; and
   d. transmitting said pre-processed group of one or more items of digital content to said server device for subsequent publishing to said one or more devices that are remote from said server device and said client device.

2. The method of claim 1, wherein said receiving pre-processing parameters comprises receiving a specification of a number of items of digital content.

3. The method of claim 1, wherein said receiving pre-processing parameters comprises receiving a specification of a maximum number of items of digital content.

4. The method of claim 1, wherein said receiving an identification comprises receiving an identification of a plurality of items of digital content.

5. The method of claim 1, wherein said receiving an identification comprises receiving a click command at said client device.

6. The method of claim 1, wherein said pre-processing comprises reducing a file size or compressing said digital content.

7. The method of claim 1, wherein said pre-processing comprises changing a quality of said digital content.

8. The method of claim 1, further comprising transmitting identifying information for said pre-processed group of one or more items of digital content.

9. The method of claim 1, wherein said previously received pre-processing parameters enable said client device to place said identified group of one or more items of digital content into a specified form in preparation for publication to one or more devices on which said identified group of one or more items of digital content is to be electronically displayed.

10. The method of claim 1, wherein said pre-processing comprises resizing said digital content.

11. A computer implemented method of pre-processing media objects in a local device for subsequent transmission to a remote device, comprising:
   a. receiving pre-processing parameters from a remote device, said pre-processing parameters including a specification of an amount of media data;
   b. receiving an identification of a group of one or more media objects for transmission, a collective media data of said group of one or more media objects being limited by said received pre-processing parameters;
   c. pre-processing said identified group of one or more media objects using said received pre-processing parameters, wherein said pre-processing comprises changing a file format of said media object; and
   d. transmitting said pre-processed group of one or more media objects to the remote device.

12. A computer implemented method of pre-processing media objects in a local device for subsequent transmission to a remote device, comprising:
   a. receiving pre-processing parameters from a remote device, said pre-processing parameters including a specification of an amount of media data;
   b. receiving an identification of a group of one or more media objects for transmission, a collective media data of said group of one or more media objects being limited by said received pre-processing parameters;
   c. pre-processing said identified group of one or more media objects using said received pre-processing parameters, wherein said pre-processing comprises encoding or otherwise converting said media object; and
   d. transmitting said pre-processed group of one or more media objects to the remote device.

13. A computer implemented method of pre-processing digital content in a client device for subsequent electronic publishing, comprising:
   a. receiving an identification of digital content, said digital content including one or more of image content, video content, and audio content;
   b. pre-processing said identified digital content at said client device in accordance with one or more pre-processing parameters that are received from a device separate from said client device to produce pre-processed digital content, said one or more pre-processing parameters controlling said client device in a placement of said digital content into a specified form in preparation for publication to one or more devices that are remote from a server device and said client device;
c. retrieving information that enables identification of a user, said retrieved information being available to said client device prior to said received identification; and
d. transmitting a message from said client device to said server device for subsequent publishing device to said one or more devices that are remote from said server device and said client device, said transmitted message including said pre-processed digital content and said retrieved information.

14. The method of claim 13, wherein said pre-processing comprises reducing a file size or compressing said digital content.

15. The method of claim 13, wherein said pre-processing comprises changing a quality of said digital content.

16. The method of claim 13, wherein said pre-processing comprises pre-processing in accordance with one or more pre-processing parameters that have been previously downloaded to said client device.

17. The method of claim 13, wherein said pre-processing comprises pre-processing in accordance with one or more pre-processing parameters that have been downloaded to said client device prior to said identification.

18. The method of claim 13, wherein said pre-processing comprises pre-processing in accordance with one or more pre-processing parameters that have been stored in memory of said client device prior to said identification.

19. The method of claim 13, wherein said retrieving comprises retrieving a user identifier.

20. The method of claim 13, wherein said retrieving comprises retrieving a password.

21. The method of claim 13, wherein said retrieving comprises retrieving in a manner that is transparent to said user.

22. The method of claim 13, wherein said one or more pre-processing parameters enable said client device to place said digital content into a specified form in preparation for publication to one or more devices on which said digital content is to be electronically displayed.

23. The method of claim 13, wherein said pre-processing comprises resizing said digital content.

24. A computer implemented method of pre-processing media objects in a local device for subsequent transmission to a remote device, comprising:
a. receiving an identification of a media object for transmission to said remote device;
b. pre-processing said identified media object at said local device in accordance with one or more pre-processing parameters that are received from a device separate from said client device to produce a pre-processed media object, wherein said pre-processing comprises changing a file format of said media object;
c. retrieving information that enables identification of a user, said retrieved information being available to said local device prior to said received identification; and
d. transmitting a message from said local device to said remote device, said transmitted message including said pre-processed media object and said retrieved information.

25. A computer implemented method of pre-processing media objects in a local device for subsequent transmission to a remote device, comprising:
a. receiving an identification of a media object for transmission to said remote device;
b. pre-processing said identified media object at said local device in accordance with one or more pre-processing parameters that are received from a device separate from said client device to produce a pre-processed media object, wherein said pre-processing comprises encoding or otherwise converting said media object;
c. retrieving information that enables identification of a user, said retrieved information being available to said local device prior to said received identification; and
d. transmitting a message from said local device to said remote device, said transmitted message including said pre-processed media object and said retrieved information.

26. A computer implemented method of distributing digital content that is pre-processed by a client device, comprising:
a. transmitting, to a client device, pre-processing parameters for digital content at said client device, said digital content including one or more of image content, video content, and audio content, said pre-processing parameters enabling said client device to place said digital content into a specified form in preparation for distribution to one or more devices that are remote from a server device and said client device;
b. receiving, from said client device, a plurality of pre-processed digital content items that have been pre-processed using said pre-processing parameters;
c. combining at least two of said plurality of pre-processed digital content items into a presentation; and
d. distributing said presentation to one or more devices that are remote from said server device and said client device.

27. The method of claim 26, wherein said pre-processing parameters include a file format for said digital content items.

28. The method of claim 26, wherein said pre-processing parameters include a compression ratio for said digital content items.

29. The method of claim 26, wherein said pre-processing parameters include a media size or aspect ratio for said digital content items.

30. The method of claim 26, wherein said pre-processing parameters include a quality setting for said digital content items.

31. The method of claim 26, further comprising transmitting media object identifier code that enables identification of digital content items.

32. The method of claim 26, further comprising receiving information associated with said plurality of pre-processed digital content items.

33. The method of claim 26, wherein said presentation is animated.

34. The method of claim 26, wherein said pre-processing parameters enable said client device to place said digital content into a specified form in preparation for distribution to one or more devices on which said digital content is to be electronically displayed.

35. A computer implemented method for pre-processing digital content at a client device for subsequent electronic publishing, comprising:
a. receiving a command that moves a graphical user interface element in a graphical user interface displayed at said client device, said received command enabling selection of digital content, said digital content including one or more of image content, video content, and audio content;
b. pre-processing said selected digital content in accordance with one or more pre-processing parameters that are received from a remote device to produce pre-processed digital content, said one or more pre-processing parameters enabling said client device to place said digital content into a specified form in preparation for publication to one or more devices that are remote from a server device and said client device;

c. displaying a preview image of said selected digital content, said preview image having a reduced size relative to said selected digital content; and d. transmitting a message that includes said pre-processed digital content to said server device for subsequent publishing to said one or more devices that are remote from said server device and said client device.

36. A computer implemented method of publishing digital content that has been pre-processed by a client device, comprising:

a. receiving, from said client device, a pre-processed group of one or more items of digital content that includes one or more of image content, video content, and audio content, wherein a collective digital content of said group of one or more items of digital content is limited by a specification of an amount of digital content, said group of one or more items of digital content being pre-processed in accordance with pre-processing parameters that were provided to said client device by a device separate from said client device, said pre-processing parameters controlling said client device in a placement of said identified group of one or more items of digital content into a specified form in preparation for distribution to one or more devices that are remote from a server device and said client device; and b. distributing, by said server device via an electronic network, information based on said pre-processed group of one or more items of digital content to one or more devices that are remote from said server device and said client device.

37. A computer implemented method of distributing digital content that has been pre-processed by a client device, comprising:

a. receiving, from said client device, pre-processed digital content that includes one or more of image content, video content, and audio content, and information retrieved by said client device that enables identification of a user, said retrieved information being available to said client device prior to an identification of said digital content at said client device, wherein said digital content is pre-processed by said client device in accordance with pre-processing parameters that were provided to said client device by a device separate from said client device, said pre-processing parameters controlling said client device in a placement of said digital content into a specified form in preparation for distribution to one or more devices that are remote from a server device and said client device; and b. distributing, by said server device via an electronic network, information based on said pre-processed digital content to one or more devices that are remote from said server device and said client device.

38. A computer implemented method for pre-processing digital content in a client device for subsequent electronic distribution, comprising:

a. initiating, by said client device, a transfer of digital content from said client device to a server device, said digital content including one or more of image content, video content, and audio content;

b. pre-processing said digital content at said client device in accordance with one or more pre-processing parameters, said one or more pre-processing parameters being provided to said client device from a device separate from said client device, said one or more pre-processing parameters controlling said client device in a placement of said digital content into a specified form in preparation for publication to one or more devices that are remote from a server device and said client device; and c. transmitting a message from said client device to said server device for subsequent distribution to said one or more devices that are remote from said server device and said client device, said transmitted message including said pre-processed digital content.

39. The method of claim 38, wherein said pre-processing comprises pre-processing said digital content in accordance with pre-processing parameters that are provided to said client device by said server device.

40. The method of claim 38, further comprising receiving an identification of said digital content for transmission prior to said pre-processing.

41. The method of claim 38, wherein said pre-processing comprises reducing a file size or compressing said digital content.

42. The method of claim 38, wherein said pre-processing comprises resizing said digital content.

43. The method of claim 38, wherein said pre-processing comprises changing a file format of said digital content.

44. The method of claim 38, wherein said transmitted message includes identifying information for said digital content.

45. The method of claim 44, wherein said identifying information is retrieved from storage in said client device.

46. The method of claim 45, wherein said identifying information includes a file name.

47. The method of claim 45, wherein said identifying information includes location information.

48. The method of claim 47, wherein said identifying information includes zip code information.

49. The method of claim 45, wherein said identifying information includes user information.

50. The method of claim 45, wherein said identifying information includes information describing said digital content.

51. A computer implemented method for distributing digital content that has been pre-processed by a client device, comprising:

a. receiving, from said client device, digital content that has been pre-processed at said client device in accordance with one or more pre-processing parameters that have been provided to said client device from a device separate from said client device, said digital content including one or more of image content, video content, and audio content, said one or more pre-processing parameters controlling said client device in a placement of said digital content into a specified form in preparation for distribution to one or more devices that are remote from a server device and said client device; and b. publishing, by said server device via an electronic network, information based on said pre-processed digital content to one or more devices that are remote from said server device and said client device.

* * * * *